United States Patent [19]

Herbig

[11] 3,817,088

[45] June 18, 1974

[54] MAGNETIC MEMORY DISC PACK BALANCING SYSTEM

[75] Inventor: Paul G. Herbig, San Jose, Calif.

[73] Assignee: Caelus Memories, Inc., San Jose, Calif.

[22] Filed: Aug. 23, 1972

[21] Appl. No.: 283,049

[52] U.S. Cl. .......................... 73/66, 29/604, 73/468, 340/174.1 C

[51] Int. Cl. ........................ G01m 1/16, G01m 1/32

[58] Field of Search .......... 73/66, 460, 468; 74/573; 29/604; 340/174.1 C

[56] References Cited

UNITED STATES PATENTS

| | | | |
|---|---|---|---|
| 1,949,478 | 3/1934 | Kindelmann et al. | 74/573 UX |
| 3,151,488 | 10/1964 | Tracy et al. | 74/573 X |
| 3,643,240 | 2/1972 | Raiser | 340/174.1 C |

FOREIGN PATENTS OR APPLICATIONS

| | | | |
|---|---|---|---|
| 80,405 | 1/1956 | Netherlands | 74/573 |

*Primary Examiner*—James J. Gill

*Attorney, Agent, or Firm*—Lindenberg, Freilich & Wasserman

[57] ABSTRACT

A method for constructing and balancing magnetic memory disc packs, including forming several threaded holes completely through a thick hub member, assembling a stack of magnetic memory discs on the hub member, retaining the disc to the hub member by attaching a clamp thereto using short screws that project only partially through the hub member so that the other ends of the threaded holes are empty, and dynamically balancing the assembled disc pack by installing one or more screws in the ends of the holes opposite the clamp.

3 Claims, 8 Drawing Figures

MAGNETIC MEMORY DISC PACK BALANCING SYSTEM

BACKGROUND OF THE INVENTION

This invention relates to magnetic memory disc packs, and more particularly to a method for constructing and balancing such disc packs.

One type of computer memory utilizes replaceable magnetic memory disc packs that include one or more discs mounted on a central hub. The disc pack is installed on a drive which rotates it while read/write heads glide above the surfaces of the discs. The discs are rotated at a high speed such as 3,600 RPM. Accordingly, care must be taken to assure accurate balancing of the rotatable portion of the disc pack assembly. Such balancing frequently has been accomplished by adhesively applying lead weights to the retainer of the disc pack. When disc packs with adhesively-applied lead weights have been installed in new, higher speed disc drives, the weights have been found to occasionally fly off. Thus, a method is needed for balancing disc packs which permits use of the disc packs at higher speeds. It would be desirable if such a method could be utilized without requiring redesign of the disc packs or their manner of assembly prior to the balancing operation. It also would be highly desirable if a balancing method were available which could be applied to existing disc packs to permit their operation at higher speeds, and therefore permit their use in the newer, higher speed disc drives, and particularly if the balancing method could be applied in the field by repairmen rather than necessitating return of the disc packs to the factory.

SUMMARY OF THE INVENTION

In accordance with one embodiment of the present invention, a balancing method is provided which permits balancing of disc packs of the type that include a thick main hub member having a plurality of threaded holes and a clamp fastened by short screws to one face of the hub member. The method includes threading one or more headless screws into the ends of the threaded holes opposite the retainer and deforming the threads of the holes to keep the screws in place. The screws can be installed without changing the disc pack construction and at a time after final assembly of the rotating portion of the disc pack assembly, and the screws do not result in any projections from the disc pack. Although only a limited number of threaded holes are provided, such as only six equally spaced holes, accurate balancing can be achieved by installing set screws in one or more of the holes.

Disc packs originally containing adhesively applied weights, can be converted in the field by repairmen. The adhesively-held weights are removed and set screws are threaded into the pre-existing holes in line with or on either side of the weight location. Set screws of at least two different weights are provided. Even though the adhesively-held weights may have any circumferential position with respect to the threaded holes, accurate balancing can be achieved by the use of screws of different weights installed in one or more of the holes.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
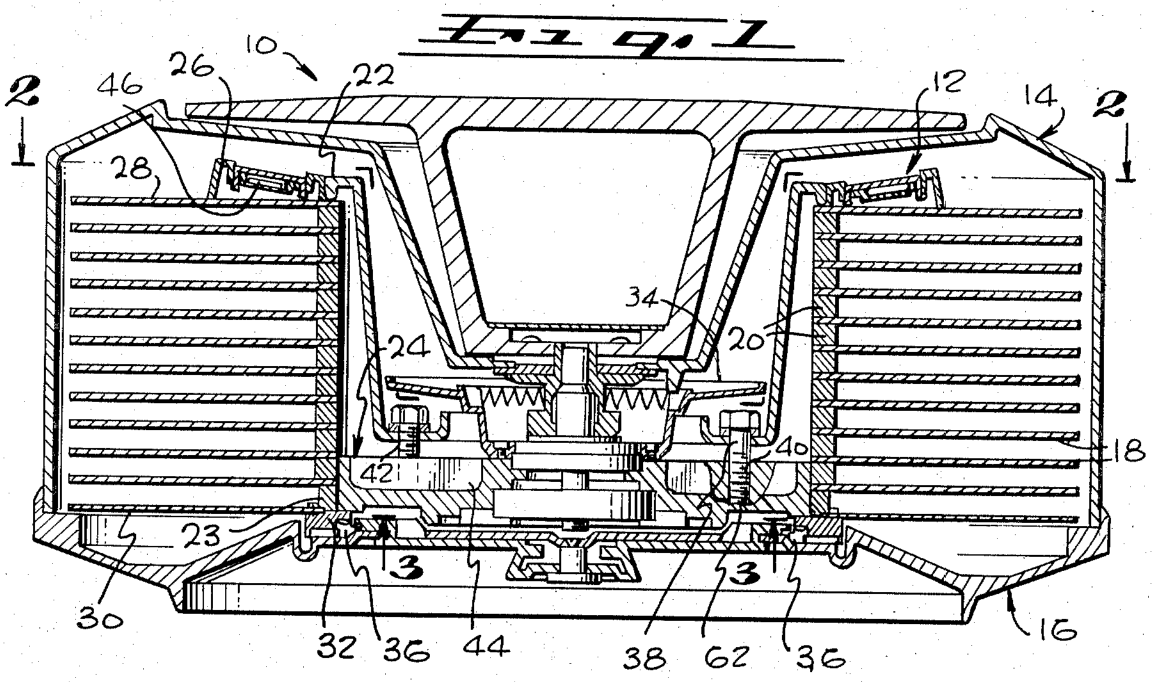
FIG. 1 is a sectional side view of a disc pack assembly constructed in accordance with the invention.
Figure 2:
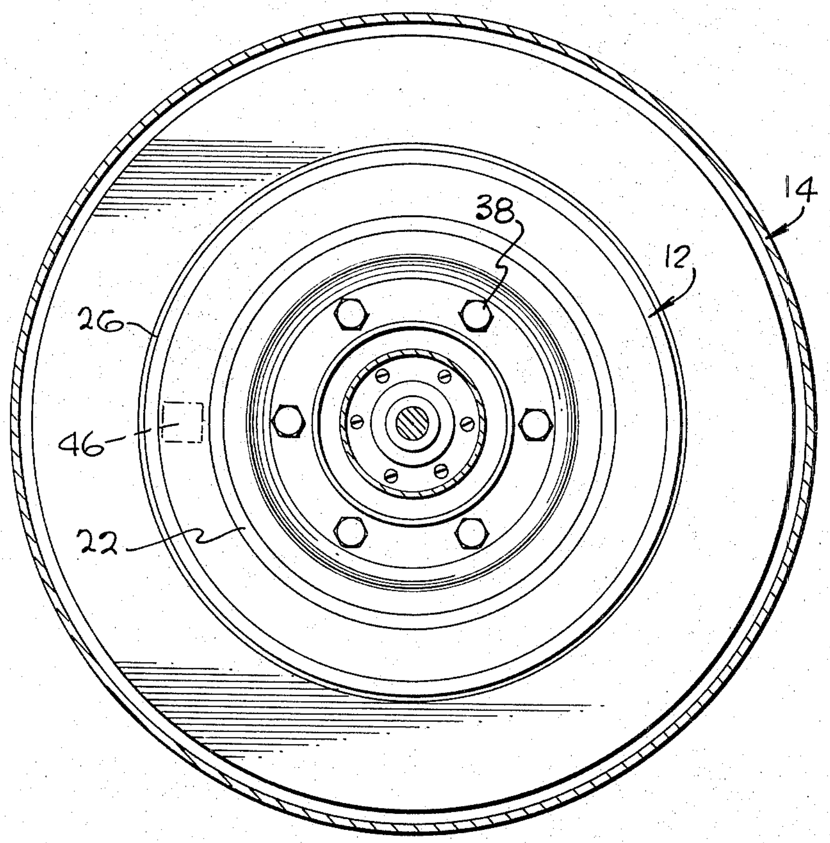
FIG. 2 is a view taken on the line 2—2 of FIG. 1.
Figure 3:
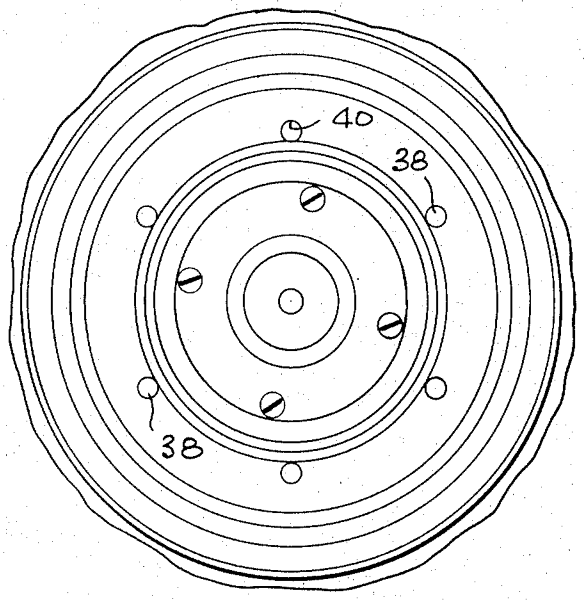
FIG. 3 is a view taken on the line 3—3 of FIG. 1.

FIG. 1 illustrates a disc pack assembly which includes a disc pack 12 that is rapidly rotated on a drive machine, a top cover assembly 14, and a bottom cover assembly 16. Both of the cover assemblies 14, 16 are removed from the disc pack 12 when the latter is installed on a drive machine. The disc pack 12 includes a stack of magnetic memory discs 18 spaced apart by separators 20 and clamped together between the periphery of a clamp member 22 and a flange 23 on a main hub member 24. A trim shield 26 and an upper cover disc 28 are mounted at the top of the stack, while a bottom cover disc 30 and retainer 32 are mounted at the bottom of the stack. A retainer lock ring 34 is attached to the main hub member 24, and it acts in conjunction with additional elements of the disc pack to releasably hold the top cover assembly 14. The retainer disc 32 has segmented portions 36 that releasably hold the bottom cover assembly 16.

In the construction of the disc pack, the clamp 22 and main hub member 24 are placed at opposite ends of the stack of memory discs 18, and six screws or bolts 38 are installed to attach the clamp to the main hub member. In order to prepare for this operation, six holes 40 are drilled through thick ribs 44 of the main hub member and these holes are tapped to form internal threads throughout the lengths of the holes. Six corresponding unthreaded holes 42 are formed in the clamp 22. The main hub member 24 is thick, at least at the ribs 44 thereof in which the holes 40 are formed. Each of the screws 38 has a length short enough so that it does not project completely through the main hub member 24, but instead may project only about one-half or less through the threaded holes 40. The presence of the threaded holes which are vacant at the bottom, is taken advantage of in the balancing method of this invention.

In the manufacture of disc packs 12, balancing must be performed on the completely assembled disc pack. This is accomplished by rapidly rotating the assembled disc pack on a balancing machine, which indicates the directions and amounts of imbalance. Previously, balancing was accomplished by applying lead-weights cut from sheets of lead and held to surfaces of the disc pack by an adhesive. Weights, such as weight 46, were applied to the shield 26, and weights were also pplied to the retainer 32. In one manufacturing procedure, only two sizes of weights were utilized, these being 1 gram adhesive weights and 2 gram adhesive weights. One or more weights could be applied to the shield 26 or the retainer 32, and the weights could be attached at any circumferential positions thereabout to achieve accurate balancing.

The disc packs constructed in the manner described above were found to operate reliably in older machines which rotated them at speeds such as 2,400 RPM. However, newer machines have been developed which rotate their disc packs at higher speeds, such as 3,600 RPM. When the disc packs are operated in the new machines, however, the weights applied to the lower surface of the retainer 32 have occasionally broken loose due to the much higher centrifugal forces. The weights 46 on the shield 26 have not broken loose, which may be due to the incline or banking or the surface to which they are attached. It would be possible to redesign the retainer 32 or main hub member 24 to provide a banked surface to move securely hold the lead weights thereon. However, this would necessitate redesign and some retooling in the case of new disc packs. Furthermore, such a redesign would not be applicable to adaptation of existing disc packs for higher speed operation. In order to permit economical conversion of existing disc packs, a conversion process must be useable by an ordinary repairman and must be capable of rapid performance using a minimum of equipment.

In accordance with the present invention, balancing and rebalancing processes are provided for application to disc packs to prepare them for high speed operation, which are useable at the factory as well as in the field. The process involves the installation of headless screws in the existing threaded holes to balance the disc pack, the method sometimes involving the installation of screws in two or more of the pre-existing holes to achieve the same balancing effect as a concentrated lead weight that could be applid at any location.

Figure 5:
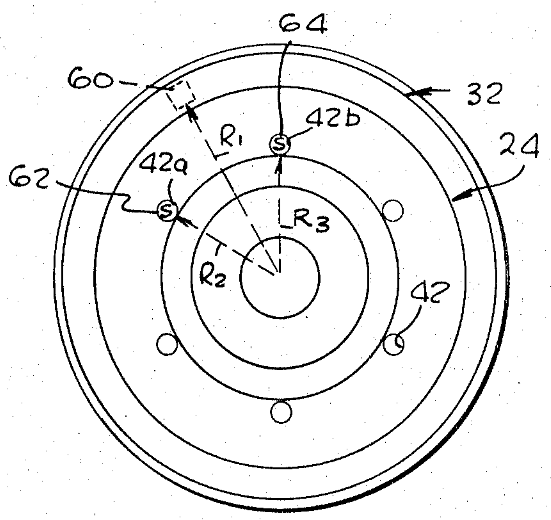
FIG. 5 is a view similar to FIG. 3, but showing the relative positions of new and replaced weights in one situation.

An understanding of the way in which the previously balanced disc pack is rebalanced for use at high speed can be had by considering examples of the process. FIG. 5 illustrates the bottom surface of a hub assembly including the main hub member 24 and retainer 32 which previously contained a single balancing weight having a mass of 2 grams and located at the position indicated at 60 in FIG. 5. The rebalancing of the disc pack for operation at higher speeds is accomplished by first removing the weight 60 and then installing screws in the threaded holes 42 which are unfilled at their lower ends. If holes could be drilled and tapped just for the balancing operation, then rebalancing could be achieved by merely drilling a hole at a location where the weight 60 was removed and installing a screw having a weight of 2 grams. However, such a drilling and tapping operation cannot be readily performed in the field and cannot even be economically performed at the factory. Furthermore, it is uneconomical to store a large number of screws of a wide range of different weights, and furthermore, the screw weights cannot be very large because the threaded holes can only accomodate screws of a limited size. The screws must not be allowed to protrude from the lower surface of the disc pack, or they will prevent accurate seating of the disc pack on a drive spindle of the drive machine.

Figure 7:
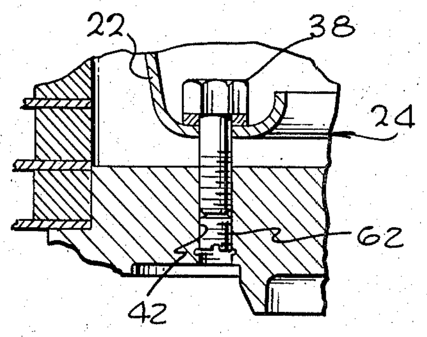
FIG. 7 is a partial sectional side view illustrating the manner in which a light weight is installed.
Figure 8:
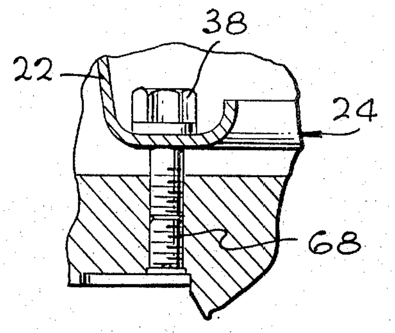
FIG. 8 is a view similar to FIG. 7, but for a heavy weight.

The rebalancing of the disc pack of FIG. 5 is accomplished by installing two screws 62, 64 of a predetermined weight in holes 42*a* and 42*b* which lie at circumferential positions on either side of the previous position of the weight 60. The circumferential position of an object refers to the angular position of an imaginary radial line which extends from the axis of rotation 65 to the object. Thus, the weight 60 can be said to lie at a circumferential position between holes 42*a* and 42*b* because the radial line $R_1$ to weight 60 lies between the lines $R_2$ and $R_3$ extending to those holes. The field repairman is supplied with a kit containing only two sizes of screws, which may be referred to as small screws and large screws. The small screws have weights of approximately 2.1 grams while the large screws have weights of approximately 3.6 grams. In one type of installation, the balancing effect of the weights at 62 and 64 is approximately the same as the effect of the weight of 2 grams at the position 60. The weights are installed in the manner shown in FIGS. 7 and 8. FIG. 7 illustrates a small weight 62 installed in a hole 42, the other end of the hole being occupied by a bolt 38. The screw 42 is of the headless type, so that no part of it protrudes from the hole. The screw 62 is screwed down into the hole as far as it will go, and then the threads of the hole 42 are deformed to hold the screw in place so it does not come out. The installation of a large screw, as illustrated in FIG. 8, is accomplished in the same manner. The large screw 68 is of the same diameter as the small screw 62, but of greater length. The length of the large screw is still short enough to permit full reception in the holes 42 and to permit deformation of the threads of the hole to keep the large screw in place.

Figure 4:
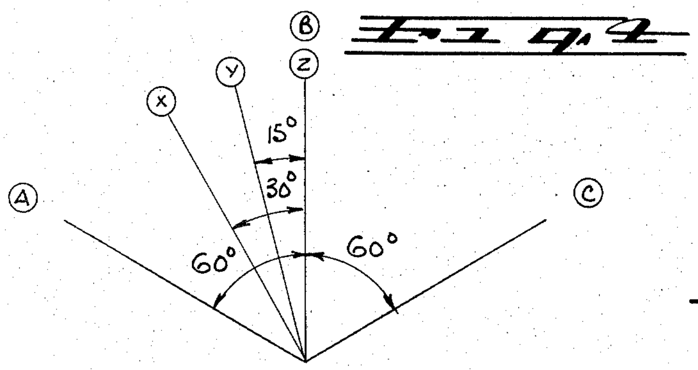
FIG. 4 is a diagrammatic view indicating the positions of replacement weights in relation to the weights they replace.

In order to facilitate field repairs, a chart of the type shown in FIG. 4 is supplied to field repairman, together with the following table.

| LEAD WEIGHT LOCATION | QUANTITY LEAD WEIGHTS | SET SCREW PLACEMENT |
|---|---|---|
| X | 1 | 1 small A, 1 small B |
| X | 2,3 | 1 large A, 1 large B |
| X | 4 | Return to plant for balancing |
| Y | 1 | 1 large B |
| Y | 2 | 1 large A, 1 large B |
| Y | 3 | 1 large A, 1 large B, 1 large C |
| Y | 4 | Return to plant for balancing |
| Z | 1 | 1 large B |
| Z | 2 | 1 small A, 1 large B, 1 small C |
| Z | 3,4 | 1 large A, 1 large B, 1 large C |

Figure 6:
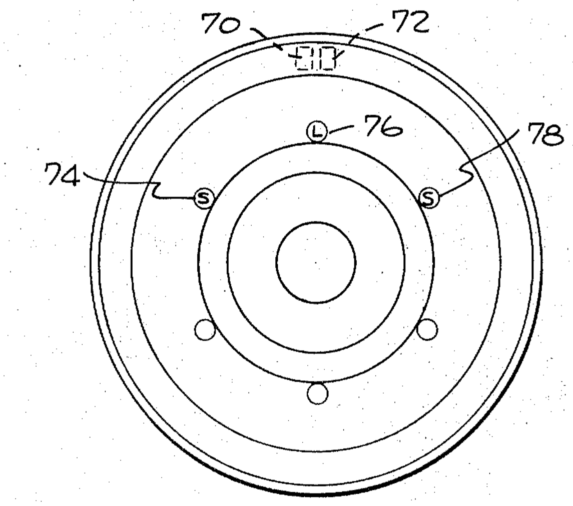
FIG. 6 is similar to FIG. 5, but showing the weight positions for a different situation.

In the above table, the first column designates each of three locations X, Y or Z of the lead weight that is to be replaced. As illustrated in FIG. 4, these three locations X, Y and Z are circumferentially spaced by 30°, 15° and 0° from a threaded hole "B" where a screw can be received. The second column in the above table designates the quantity of lead weights to be replaced, or in other words the mass to be replaced which is 1, 2, 3, or 4 times a unitary weight, such as 2 grams. The last column in the above table designates the size of screws and their placements, to replace the lead weights which are defined in the same row of the table. For example, the second from last row in the table designates the replacement of two lead weights (4 grams) at the position in FIG. 4 which lies on the same radial line as the threaded hole "B." The table indicates that the replacement is obtained by installing one small screw (of a mass of approximately 2.1 grams) in the screw hole at the position A in FIG. 4, one large screw (of a mass of 3.6 grams) at the position B, and a small screw at the position C. This example is indicated in FIG. 6, wherein the lead weight to be replaced in indicated by the two squares 70, 72, and the screws that replace the lead weight are indicated at 74, 76 and 78, two of these screws 74, 78 being small screws and the screw 76 being a large screw.

It may be noted from the above table that in most cases, at least two screws are installed in circumferentially spaced holes to replace a concentrated weight. The combination of two different weights of screws and the possibility of placing the screws in various holes permits an accurate balancing of the disc pack. This accurate rebalancing is achieved in a digital fashion, that is with a limited number of distinct weights and a limited number of distinct positions, even though the weights to be replaced were positioned in an analog fashion, that is, at continuously variable circumferential positions. The digital manner of replacement results from the distinct placement of the screw holes and the desirability of providing only a limited number of different screw weights. This digitizing is relatively easy for a repairman to follow accurately in the field, so it reduces the time required to rebalance and reduces error.

The balancing of disc packs at the factory is accomplished in a manner similar to the manner of replacement in the field, except that there are no lead weights to be removed. A workman rotates the completely assembled disc pack on a balancing machine which indicates the direction and amount of unbalance. The operator notes this and converts the balancing requirement to a screw insertion requirement using the same table given above. The fact that the old but rebalanced disc packs have the same construction as the new disc packs that were originally balanced by screw insertion, means that the number of different models of disc packs is minimized. This has several advantages, including the fact that an old disc pack that has become damaged or worn and which is over-hauled at the factory, does not have to be designated as an old model, but can be inventoried in the same group as reconditioned newer disc packs that were originally balacned with screws.

Thus, the invention provides a method for adding weights to a magnetic memory disc pack to balance it, which provides secure holding of the weights to enable high speed operation, and which enables accurate and rapid balancing using a minimum number of different kinds of balancing weights which are installed at a minimum number of distinct positions on the disc pack. The balancing weights are screws that are installed in a thick main hub member, in the ends of threaded holes therein whose other ends receive bolts that hold a clamp to the main hub member. The invention also provides a rebalancing method which can be rapidly and accurately performed by repairmen in the field, to convert disc packs for higher speed operation.

Although particular embodiments of this invention have been described and illustrated herein, it is recognized that modifications and variations may readily occur to those skilled in the art and consequently it is intended that the claims be interpreted to cover such modifications and variations.

What is claimed is:

1. A method for constructing a memory disc assembly comprising:

forming a hub member with a plurality of holes extending completely therethrough, said hub member being formed with a peripheral flange and said holes being formed in a central region closer to the center of the hole than the flange;

forming internal threads along the walls of said holes;

assemblying a stack of memory discs coaxially with said hub and with one end of the stack held against the flange of the hub;

assemblying a clamp with a peripheral portion and a central portion that has holes therethrough so the peripheral portion lies over an end of the stack opposite the flange of the hub and the central portion lies facewise against the central hub region and with the holes of the clamp and hub member aligned;

inserting a plurality of screws that are shorter than the combined thicknesses of the clamp and hub member through the holes of the clamp and screwing them into the threaded holes of the hub;

rotating the assembled hub member, clamp and stack of memory discs while measuring the direction and amount of imbalance;

screwing at least one headless screw into one of said threaded holes in the hub member from the face of the hub member opposite the clamp to substantially balance at least the portion of the assembly nearest the hub member, said screw being screwed far enough so all of it lies within the threaded hole; and deforming the threads of the hole containing the headless screw at a location near the end of the hole that lies opposite the clamp.

2. A method for balancing memory disc packs which each include a hub portion and at least one memory disc fixed to the hub portion; comprising:

forming a plurality of uniformly spaced threaded holes in the hub portion of each memory disc pack;

rotating each of the memory disc packs which have said threaded holes therein on a balancing machine to determine the direction and amount of imbalance of each disc pack; and screwing a plurality of screws into a plurality of said threaded holes of at least some of said memory disc packs to balance them; and wherein said threaded holes are circumferentially spaced 60° from one another;

each of said screws has either of two predetermined masses wherein one predetermined mass L is larger than the other mass S; and said screws are installed in selected of said holes A, B and C with hole B lying between and spaced 60° from each of the holes A and C, to provide approximately the same balancing correction as would be supplied by a concentrated weight substantially in accordance with the following table:

| LOCATION OF CONCENTRATED WEIGHT | MASS OF CONCENTRATED WEIGHT | SCREW PLACEMENT |
|---|---|---|
| X | 1 | 1 small A, 1 small B |
| X | 2 | 1 large A, 1 large B |

-Continued

| LOCATION OF CONCEN-TRATED WEIGHT | MASS OF CONCEN-TRATED WEIGHT | SCREW PLACEMENT |
|---|---|---|
| X | 3 | 1 large A, 1 large B |
| Y | 1 | 1 large B |
| Y | 2 | 1 large A, 1 large B |
| Y | 3 | 1 large A, 1 large B, 1 large C |
| Z | 1 | 1 large B |
| Z | 2 | 1 small A, 1 large B, 1 large C |
| Z | 3 | 1 large A, 1 large B, 1 large C |
| Z | 4 | 1 large A, 1 large B, 1 large C |

where X represents a concentrated weight at a location circumferentially spaced 30° counterclockwise from the hole B, Y represents a concentrated weight at a location 15° counterclockwise from hole B, and Z represents a concentrated weight at a location in line with hole B;

the mass designations 1, 2, 3 and 4 in the second column represent concentrated weights of masses respectively one, two, three, or four times a predetermined imaginary mass; and one small A, one small B, one small C represent the placement of a screw of the mass S in the holes A, B or C respectively, and one large A, one large B, one large C represent the placement of a screw of the mass L in the holes A, B or C respectively.

3. A method for constructing a memory disc assembly with a hub portion and a memory disc fixed to the hub portion, comprising:

forming a hub portion with a pair of members which have adjacent face portions;

forming a plurality of aligned axially extending holes in said members;

threading said holes;

attaching a memory disc to said hub portion;

rotating said hub portion and disc on a balancing machine to determine the direction and amount of imbalance; and screwing at least one balancing screw in one of said threaded holes to balance said hub portion;

said pair of members of said hub portion being fastened together by screwing a plurality of fastening bolts through them which are short enough to project only partially through at least one of the members; and said balancing screw being screwed into one of said members from an end opposite a fastening bolt.

* * * * *